ARTHUR O. GARRETT, INVENTORS
CHRISTOPHER E. FUNNELL
WILLIAM L. HOFFMAN
BY A. B. Bowman
ATTORNEY Patented Aug. 26, 1924.

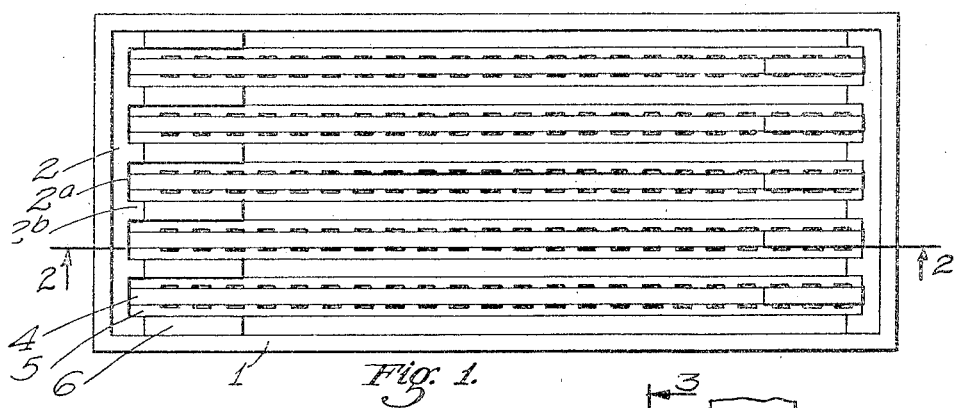
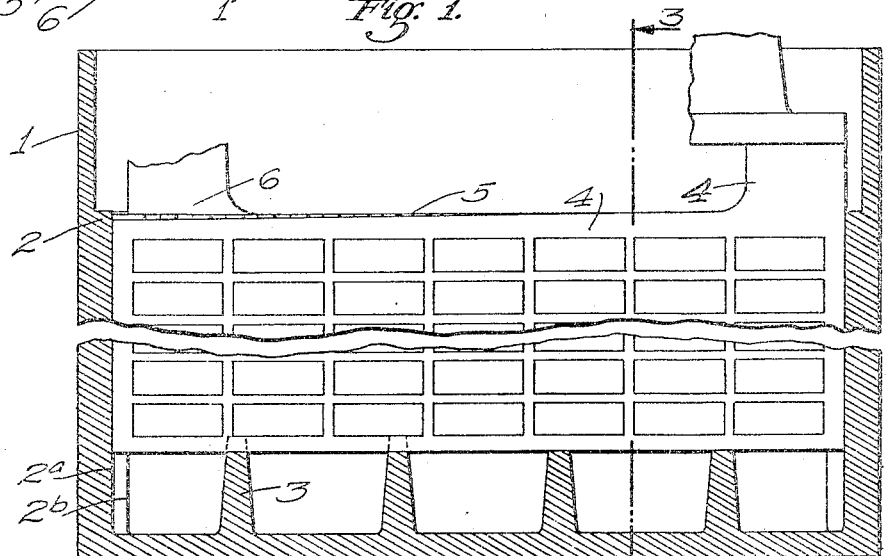
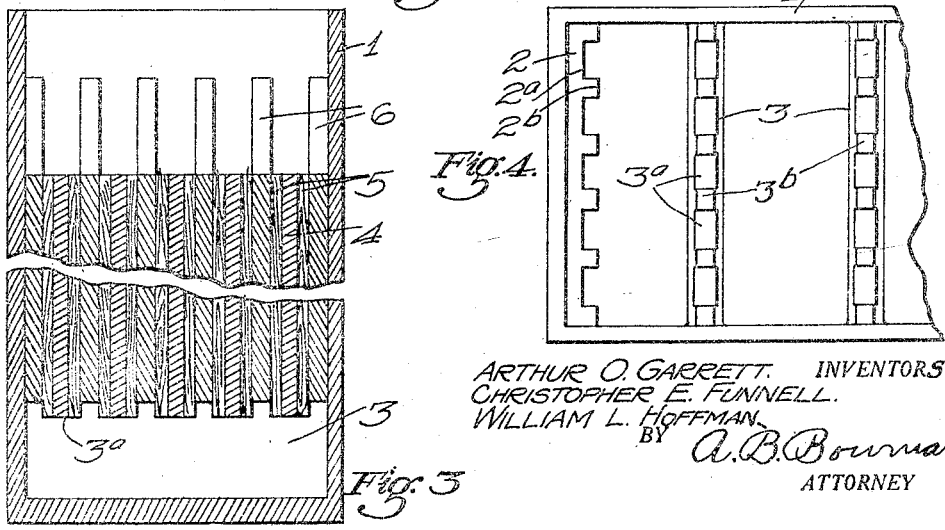

1,506,297

UNITED STATES PATENT OFFICE.

ARTHUR O. GARRETT, OF SAN DIEGO, AND CHRISTOPHER E. FUNNELL AND WILLIAM L. HOFFMAN, OF LOS ANGELES, CALIFORNIA; SAID FUNNELL AND SAID GARRETT ASSIGNORS TO SAID HOFFMAN.

STORAGE-BATTERY CELL.

Application filed November 4, 1920. Serial No. 421,696.

*To all whom it may concern:*

Be it known that we, ARTHUR O. GARRETT, CHRISTOPHER E. FUNNELL, and WILLIAM L. HOFFMAN, citizens of the United States, residing at San Diego, Los Angeles, and Los Angeles, respectively, in the counties of San Diego, Los Angeles, and Los Angeles, respectively, and State of California, respectively, have invented certain new and useful Storage-Battery Cells, of which the following is a specification.

Our invention relates to storage battery cells and more particularly to means for supporting the plates at the side and bottom edges or either of said edges and may be an insert member used in the conventional battery jar or may be an integral portion of the cell box when constructed and the objects of our invention are: First, to provide a means for supporting a portion of the plates and separators at the side edges thus preventing their warping or getting out of place and their pressure against each other and consequent wear of the separators causing the plates to short; second, to provide means for supporting some of said plates and the separators at both the side edges and bottom edges to prevent their lateral movement or warping; third, to provide means for supporting a portion of the plates and separators in each cell independent of the other plates and providing spaces for expansion of the plates and also forming a cushion at the ends of the plates that are supported; fourth, to provide a means of this class which is very simple and economical of construction, easy to install, positive in its action and provides a battery cell which is very durable and efficient and which will not readily deteriorate or get out of order.

Figure 5:
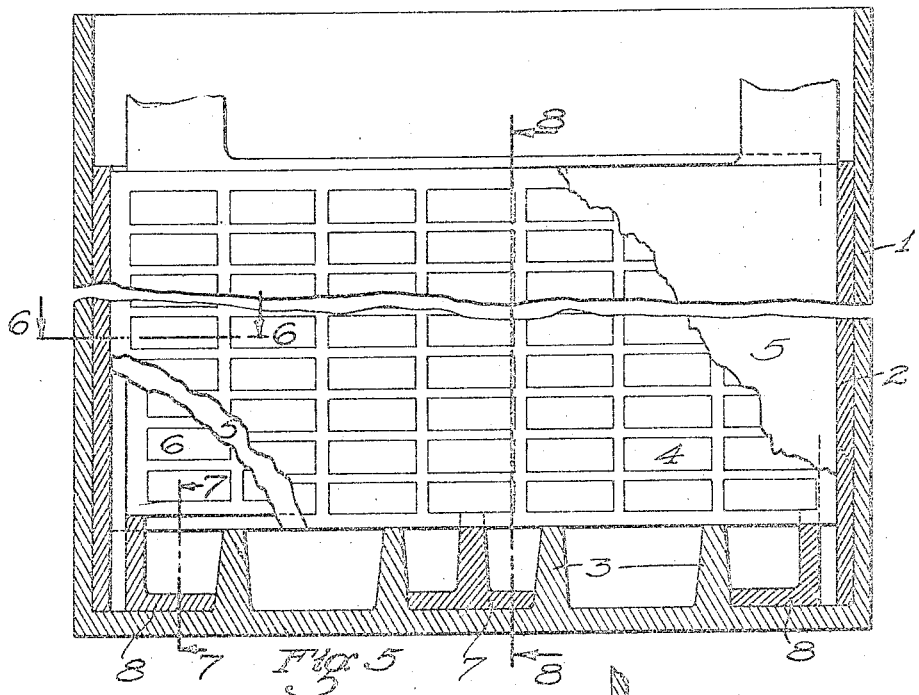
Figure 6:
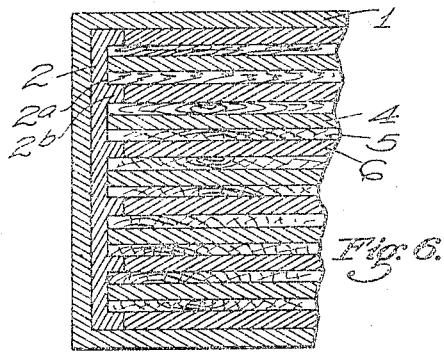
Figure 7:
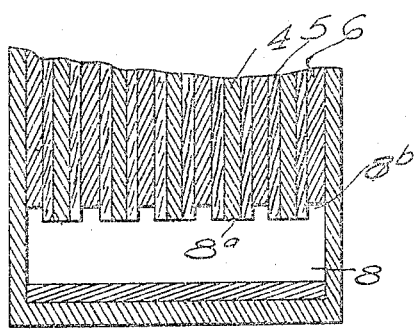
Figure 8:
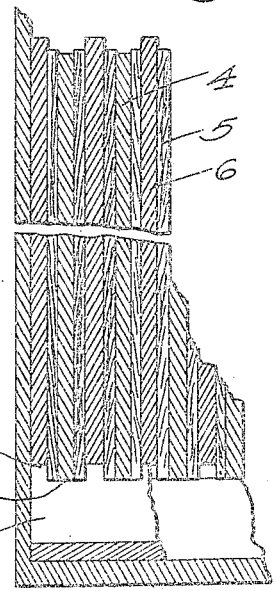

With these and other objects in view as will appear hereinafter our invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a top or plan view of a cell with the cover removed showing the plates and separators positioned therein in the form in which the supports are molded integrally therein; Fig. 2 is a fragmentary sectional view thereof through 2—2 of Fig. 1; Fig. 3 is a transverse sectional view through 3—3 of Fig. 2; Fig. 4 is a fragmentary plan view of the bottom of the battery jar with the plates and separators removed; Fig. 5 is a fragmentary sectional view of a cell with insert members which are used in connection with the conventional battery jar now in use and showing a modified form of construction for supporting the lower edges of the plates; Fig. 6 is a fragmentary sectional view thereof through 6—6 of Fig. 5; Fig. 7 is a fragmentary sectional view through 7—7 of Fig. 5 and Fig. 8 is a fragmentary sectional view thereof through 8—8 of Fig. 5 showing portions broken away and in sections to facilitate the illustration.

Similar characters of reference refer to similar parts and portions throughout the several views of the drawings.

The jar 1, side edge plate supports 2, bottom supports 3, positive plates 4, separators 5 and negative plates 6 constitute the principal parts and portions of our storage battery cell.

The jar 1 is preferably a rectangularly shaped member in the conventional form, except that it is provided in its ends with a plurality of spaced apart grooves $2^a$ in the support 2 which are of the proper width to receive the ends of the positive plates 4 and separator 5 on each side, it being noted that there may be sufficient spaces in these grooves to provide for sufficient expansion of the positive plates. The negative plates 6 are slightly narrower than the positive plates 4 and separators 5 and they occupy the spaces between the separators on the opposite sides of the positive plates and between the ribs $2^b$, between which the grooves $2^a$ are positioned. It will be noted that these ribs $2^b$ may be slightly thicker than the negative plate to provide for expansion of the plates as desired. It will also be noted that this support consisting of the grooves $2^a$ and ribs $2^b$ may be an integral portion of the internal portion of the ends of the battery jar as shown best in Figs. 1 to 4 inclusive or may be a separate insert supporting member as shown best in Figs. 5 and 6 of the drawings. The supports, 3 which extend upwardly in the conventional cell for supporting the bottom of the plates and separators and which provides a space for the inactive material in the bottom of the jar, are also provided with notches 3ª of approximately the same width as the notches 2ª for receiving the lower edges of the positive plates and the separators for supporting the lower edges of the plates thus leaving lugs 3ᵇ upon the upper sides on which rest the negative plates 6, the negative plates being slightly shorter than the positive plates as well as narrower as desired, however, it will be noted that they may be permitted to extend a little higher than the top side and can be the same length as desired.

In the modified form of construction shown in Figs. 5 and 6 of the drawings, the supporting portions 2 are separate supporting members which fit in the opposite ends of the battery jars and are provided with grooves 2ª and ribs 2ᵇ the same as those which are shown as being integral portions of the ends of the jars. The means for supporting the lower edges of the plates in the modified form shown in Figs. 5, 7, and 8 inclusive is as follows:

Between the ribs 3 are positioned a plurality of supporting members 7 and 8 in the form of a T member 7 and L members 8 composed of hard rubber or other non-conducting material, it being preferred to place a T-shaped member 7 in the middle and L shape members 8 near the ends between the ribs 3 with a vertical member of each extending upwardly slightly above the upper edges of the ribs 3 and provided with grooves 7ª, the bottoms of which are level with the upper edges of the ribs 3 and leaving upwardly extending projections 7ᵇ. In the grooves 7ª rest the lower edges of positive plates and separators while on the projections 7ᵇ rest the negative plates, it being here noted that the negative plates may protrude above the positive plates and separators at the top as shown best in Fig. 8. However, it is obvious that if desired these negative plates may be slightly shorter than the positive plates. Both the members 7 and 8 are provided with these grooves 7ª and projections 7ᵇ thus providing supports for the lower edges of the plates at the middle and near each end to prevent their shifting sideways and holding them rigidly in position to prevent their misplacement, warping, twisting or buckling.

It will be noted, however, that the side edge supports may be used without the lower edge supports or the lower edge supports used without the side edge supports or both used as desired without departing from the principle of our invention.

Though we have shown and described a particular construction, combination and arrangement of parts and portions and certain modifications thereof, we do not wish to be limited to this particular construction, combination and arrangement nor to the modification thereof but desire to include in the purview of our invention, the construction, combination and arrangement substantially as set forth in the appended claims.

It is obvious that with this construction, there is provided means for supporting the side edges of either the positive or the negative plates in vertical grooves for holding them rigidly in position at the edges; that there is provided means for supporting them at their lower sides, that such means may be provided if desired with spaces enough to permit expansion and contraction of the plates; that the plates do not depend upon the supports, one against the other; that the wear on the separators is thereby reduced to a minimum; that the liability of the plates to warp, buckle or twist is also reduced to a minimum; that the plates being held in spaced relation at the edges are not liable to contact with each other and thereby short the circuit; that the means may be readily applied in any battery by integral supports molded therein or by inserts positioned in battery jars already constructed.

Having thus described our invention what we claim as new and desire to secure by Letters Patent is:

1. A storage battery cell, including a jar with end members provided with vertical spaced apart grooves therein extending from the tops of the plates positioned therein to the bottom of the jar and of a width to receive a plate and a pair of separators, plates with their side edges mounted in the middle of said grooves and separator plates with their side edges mounted in said grooves on opposite sides of said edges of said plates, the edges of a plate and two separators lodged in each groove, filling the same.

2. A storage battery cell, including a jar provided with a plurality of spaced grooves in its ends extending from the top of the plates positioned therein to the bottom of the jar and of a width to receive a plate and a pair of separators and with conforming positioned notches in the bottom ribs of said jar, plates with their side and bottom edges mounted in the middle of said grooves and separators with their side and lower edges mounted in said grooves and notches, the edges of a plate and two separators lodged in each groove and notch, filling said grooves and notches.

3. A storage battery cell, including a jar provided with a plurality of spaced grooves in its ends and conforming positioned notches in the bottom ribs of said jar, a plate of one polarity with its side and bottom edges mounted in each of said grooves and notches and two separator plates with their side and bottom edges mounted in each of said grooves and notches on opposite sides of said one polarity plate and another narrower plate of the opposite pole mounted between said separators and between said grooves and notches and resting on and against the ribs positioned between said grooves and notches.

In testimony whereof we have hereunto set our hands at Los Angeles, California, this 27th day of October, 1920.

CHRISTOPHER E. FUNNELL.
ARTHUR O. GARRETT.
WILLIAM L. HOFFMAN.